(12) United States Patent
Mohan et al.

(10) Patent No.: US 11,403,366 B2
(45) Date of Patent: Aug. 2, 2022

(54) ON-DEMAND RETRIEVAL OF INFORMATION FROM DATABASES

(71) Applicant: HEWLETT PACKARD ENTERPRISE DEVELOPMENT LP, Houston, TX (US)

(72) Inventors: Sudhakar Mohan, Santa Clara, CA (US); Aslam Khan, Santa Clara, CA (US); Michael Zayats, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 123 days.

(21) Appl. No.: 16/147,814

(22) Filed: Sep. 30, 2018

(65) Prior Publication Data
US 2020/0104382 A1    Apr. 2, 2020

(51) Int. Cl.
| | |
|---|---|
| G06F 7/00 | (2006.01) |
| G06F 16/958 | (2019.01) |
| G06F 16/22 | (2019.01) |
| G06F 16/24 | (2019.01) |

(52) U.S. Cl.
CPC ........ G06F 16/958 (2019.01); G06F 16/2282 (2019.01); G06F 16/24 (2019.01)

(58) Field of Classification Search
CPC ..... G06F 16/24; G06F 16/2282; G06F 16/958
USPC .......................... 707/602, 705, 736, 999.002
See application file for complete search history.

(56) References Cited

U.S. PATENT DOCUMENTS

| | | | |
|---|---|---|---|
| 6,518,984 B1 | 2/2003 | Maeckel et al. | |
| 7,761,451 B2 | 7/2010 | Cunningham | |
| 8,489,622 B2 | 7/2013 | Joshi et al. | |
| 9,564,919 B2 | 2/2017 | Fang et al. | |
| 2007/0192128 A1* | 8/2007 | Celestini | G06Q 40/00 705/35 |
| 2008/0098041 A1 | 4/2008 | Chidambaran et al. | |
| 2009/0198828 A1* | 8/2009 | Sullivan | G06F 16/345 709/231 |
| 2011/0040733 A1* | 2/2011 | Sercinoglu | G06F 16/3349 707/688 |
| 2012/0117462 A1* | 5/2012 | Jacobson | G06F 16/211 715/249 |
| 2018/0006877 A1* | 1/2018 | Raman | H04L 41/22 |
| 2019/0272315 A1* | 9/2019 | Walia | G06F 3/0482 |

FOREIGN PATENT DOCUMENTS

EP    1492027 A1    12/2004

OTHER PUBLICATIONS

Scott Mitchell "Efficiently Paging Through Large Amounts of Data (C#)" https://docs.microsoft.com/en-us/aspnet/web-forms/overview/data-access/paging-and-sorting/efficiently-pa.

(Continued)

*Primary Examiner* — Md I Uddin
(74) *Attorney, Agent, or Firm* — Nolte Intellectual Property Law Group

(57) ABSTRACT

Methods of providing data to a user including receiving a page request from the user for a database to provide a sub-set of data from a dataset. The method further including sending a publish request from the database to a publisher, publishing the dataset from the publisher to the database, preparing the sub-set of data in the page request in the database, and sending the sub-set of data in the page request to the user.

14 Claims, 7 Drawing Sheets

(56) References Cited

OTHER PUBLICATIONS

Radu Stoica & Anastasia Ailamaki in "Enabling Efficient OS Paging for Main-Memory OLTP Databases" 7 pages.
Sean Regan in "Paginating Data for Force.com Applications" 7 pages.
Bouzeghoub, M. el al., "A Framework for Analysis of Data Freshness," ACM, Jun. 18, 2004, pp. 59-67, http://apmd.prism.uvsq.fr/Publications/Articles/A%20Framework%20for%20Analysis%20of%20Data%20Freshness_Peralta,%20Bouzeghoub.pdf.
Kossman, D., "The State of the Art in Distributed Query Processing," ACM, Dec. 2000, pp. 422-469, http://csis.pace.edu/~marchese/CS865/Papers/p422-kossmann.pdf.

\* cited by examiner

ON-DEMAND RETRIEVAL OF INFORMATION FROM DATABASES

BACKGROUND

Compute system components often include databases that are used to store information about the, operability of the compute system. Users may access the database to review information about the system, including information about specific processes running on the system. This information may be used to check system status, debug system components, or otherwise monitor activity on the system. Such information requests by users may require considerable system resources, requiring the database to process large quantities of information.

BRIEF DESCRIPTION OF THE DRAWINGS

Examples described herein may be understood by reference to the following description taken in conjunction with the accompanying drawings, in which like reference numerals identify like elements.

Figure 1:
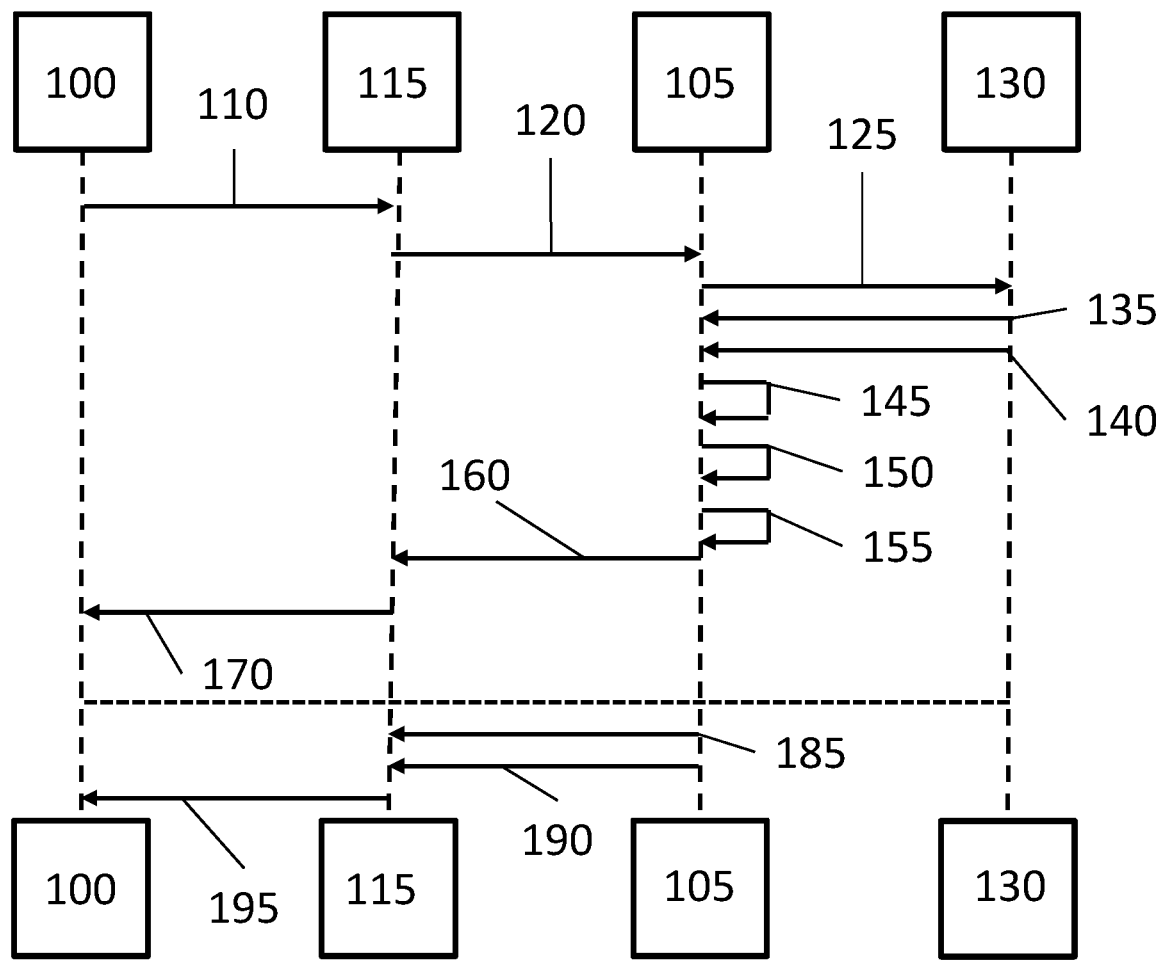
FIG. 1 is an operational flow schematic for the retrieval of information in databases in accordance with one or more example embodiments.

While examples described herein are susceptible to various modifications and alternative forms, the drawings illustrate specific embodiments herein described in detail by way of example. It should be understood, however, that the description herein of specific embodiments is not intended to be limiting to the particular forms disclosed, but on the contrary, the intention is to cover all modifications, equivalents, and alternatives falling within the spirit and scope of the examples described herein and the appended claims.

DETAILED DESCRIPTION

One or more examples are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description, of the claimed subject matter.

In the field of network computing, network connectivity between devices, compute nodes, blades, or frames of a scalable computing resource may be implemented using a network communication device. Network communication devices, such as switches, routers, hubs, bridges, etc. represent a primary communication path for sharing data between different types of computing resources generically referred to as "nodes" of a network. The shared data may represent inputs to computing processes (e.g., data or applications), outputs of computing resources (e.g., compute results), communications to coordinate distributed processes, communications between users, and other types of data.

In any "intelligent" network communication device there may be a processor, local memory, configuration information, and "current state" information, among other types of information. Collectively, the different types of information on a network communication device may be considered to represent the overall "device state" at a given point in time. For example, information on a network communication device (including its "device state") is expected to change over time, in part because while in-service and providing active communication paths for a network, the overall configuration and available devices on that network may change. In particular, routing information may change as devices become available or unavailable at different points in the overall network (e.g., a laptop device relocating). Information in routing tables and overall network connectivity may represent a portion of the device state of a network communication device.

In general, a switch may be thought of as a device in a computer network that connects together other devices ("nodes" of the network). Multiple data cables may be plugged into a switch to enable communication between different networked devices. Switches manage the flow of data across a network, typically by transmitting a received network packet only to the one or more devices for which the packet is intended. Each networked device connected to a switch can be identified by its network address, allowing the switch to direct the flow of traffic, possibly in an effort to maximize the security and efficiency of the network. A switch is more intelligent than a hub (e.g., Ethernet hub), which simply retransmits packets out of every port of the hub except the port on which the packet was received. In most cases, a hub is unable to distinguish different recipients, and therefore may have an overall lower network efficiency, but simpler configuration information, than a switch/router. Generally, a router is a networking device that forwards data packets between computer networks. Routers perform the traffic directing functions on the Internet. A data packet is typically forwarded from one router to another router through the networks that constitute an internetwork until it reaches its destination node.

As explained further below, some network communication devices are "hybrid" devices in that they perform more than one classification of service. That is, some switches may also be routers and some routers may also be switches and have hubs as part of their architecture. Accordingly, there are a variety of network communication devices (commonly referred to as switches, hubs, routers, etc.) that, may benefit from the concepts of this disclosure. Generally, embodiments of the present disclosure may provide systems and methods for the remote monitoring of network communication devices as well as remote fault analysis for such network communication devices. Such monitoring may include real time monitoring for troubleshooting and/or fault analysis as well as passive monitoring that may allow data to be accumulated over time to facilitate performance and use monitoring.

Network communication devices, such as switches, routers, and the like may be housed in data centers and may be used to connect servers and other computing devices within the data center. Monitoring of such network communication devices may require the manual connection of a user-specific data collection mechanism, such as cables, thereby allowing users to individually collect data from specified network communication devices. Other methods of monitoring and collecting data may include collecting switching device statistics from specified devices within the data center and then caching the collected data within the data center. Such systems include in data center computing and storage resources to cache and process the collected data. However, such solutions do not provide for monitoring or performing fault analysis on switching devices distributed over multiple data centers. In order to collect and collate data from multiple data centers, in data center computing and storage solutions are installed in each data center.

Switches, along with other network devices, may be monitored by users/clients in order to access the operability of the devices. The monitoring of the devices occurs by the user/client requesting data stored in the form of tables on databases connected or otherwise integrally a part of specific network devices. The tables include various information about the switch, including, for example, protocols for network layers, processes, functionality data, and the like. The tables may include numerous columns and rows, which allow the user/client to select specific information about the devices. Depending on the complexity of the device, a table for a specific device may have hundreds of thousands or even millions of columns and/or rows.

The databases may be used to store large quantities of data relating to configuration and status parameters for network devices in a compute system. User/clients may periodically send read requests for certain data to the database. Depending on the type of read request that is sent, the amount of data requested may be relatively, large, including potentially all or portions of the hundreds of thousands or even millions of lines of data stored in tables.

During such read requests the databases are required to process the request, which may take a relatively significant amount of time and system resources. While processing the request, the database may not be capable of processing other user/client requests. Similarly, the efficiency of the system may be decreased by preventing other users/clients from being able to read or write to the database while the request is processed.

Implementations of the present, disclosure may increase database efficiency and read request speed by providing for on-demand retrieval of information from a database. A publisher may be used to publish data in tabular format to the database and, rather than provide the entire database to the user/client, the database may provide the data in page format, whereby only a portion of a table is provided. After the user/client reviews the data in the page format, the user/client may request additional data, which the database may provide in subsequent pages. Because the database is not sending millions of rows and/or columns of a table at once, the database may not overload, and may be able to service other users that are trying to access the database, thereby preventing a decrease is system speed and/or efficiency.

Specific components of such systems, as well as methods of using the systems are described in detail below.

Turning to FIG. 1, an operational flow schematic for the retrieval of information in databases in accordance with one or more example embodiments is shown. As part of this implementation, a user 100 may require certain information from a database 105. User 100 may be a person or a software process and may be directly or indirectly connected to database 105. The database 105 may include single or multi-threaded databases, which may be a part of embedded software platforms (not independently shown) and may be used for storing and/or reading configuration and status parameters for a network, or network devices.

The user 100 may send a command 110 through a command line interface ("CLI") 115. The CLI 115 may include a text-based user interface that may be used to view and manage computer files. In other implementations, the user 100 may send a command through a graphical user interface ("GUI") that is not shown. A GUI may allow a user to interact with one or more components of a compute system (not independently shown) through graphical icons and visual indicators.

The command 110 sent by the user 100 through the CLI 115 may include a page request 120. The page request 120 may include a request for information on processes, configurations, status, and the like, for one or more network devices (not shown) in a compute system not otherwise shown. The information that is subsequently provided may include data stored in tables. The tables may include various information about the network devices, including, for example, protocols for network layers, processes, functionality data, and the like. The tables may include numerous columns and rows, which allow users to select specific information about the devices. Depending on the complexity of the device, a table for a specific device may have hundreds of thousands or even millions of columns and/or rows.

The page request 120 may also have one or more table parameters. Examples of table parameters may include of a number of rows, a number of columns, a number of rows and columns, a range of rows, a range of columns, a range of rows and columns, a specific row, a specific column, a page size, and a session identification. The number and ranges of rows and columns may be specified to request a sub-set of data about services or processes for particular network devices. The session identification may provide a unique identifier for the user 100, thereby allowing database 105 to provide the requested data to the correct user. For example, in certain implementations, data may be requested from database 105 from multiple users 100 either contemporaneously or in near-time.

Due to the size of the tables that may be requested, the page request 120 may include the sub-set of data in the form of a page of the table including a limited number of rows. In one implementation, user 100 may submit a page request 120 for 50 rows of a table. In other implementations, user 100 may submit a page request 120 for less than 50 rows or more than 50 rows. In still other implementations, user 100 may submit a page request 120 for a selected number of columns, such as 50, however, the page request 120 may also request more or less than 50 columns. User 100 may also request a specific range of rows, columns, or rows and columns within the table.

After the command 110 is received through CLI 115, the page request 120 is sent to database 105. Database 105 processes the page request 120 and sends a publish request 125 to a publisher 130. The publisher 130 may include a software routine that accesses specific processes from one or more network devices. The publisher 130 gathers the tabular data and publishes 135 the data in table form to the database 105. As discussed above, depending on the parameters of page request 120, the tables supplied by publisher 130 to database 105 may include the entirety of the table, which may include millions of rows and or columns of data. In other implementations, the page request 120 may include a request for a sub-set of data. In such an implementation, publisher 130 may publish 135 a portion of the table to database 105.

After the publisher 130 publishes 135 the requested tabular data, the publisher 130 may send a completion message 140, thereby instructing the database 105 that all requested information has been processed. In certain implementations the publishing 135 and the completion message 140 may be provided to database 105 from publisher 130 together.

After the database 105 receives the completion message 140, database 105 fetches 145 the requested rows within the table from the page request 120. The database 105 further prepares 150 the rows in tabular form and saves 155 the table to be sent to the user 100. After the table is saved 150, the database 105 sends 160 the table through, the CLI 115 to be viewed;.; by the user 100. At this point, the user 100 may receive 170 and view the requested table.

In certain implementations the page request 120 may include a request for a single table. However, in other implementations, the user 100 may request information that produces a table that is relatively large and cannot be processed and displayed in a single table. In such an implementation, this process may be iteratively looped, whereby after viewing the table provided in the first page request 120, the user 100 may request the next page of the table. To explain how subsequent pages of the initial page request 120 are processed, FIGS. 1 and 2 are now discussed together.

Figure 2:
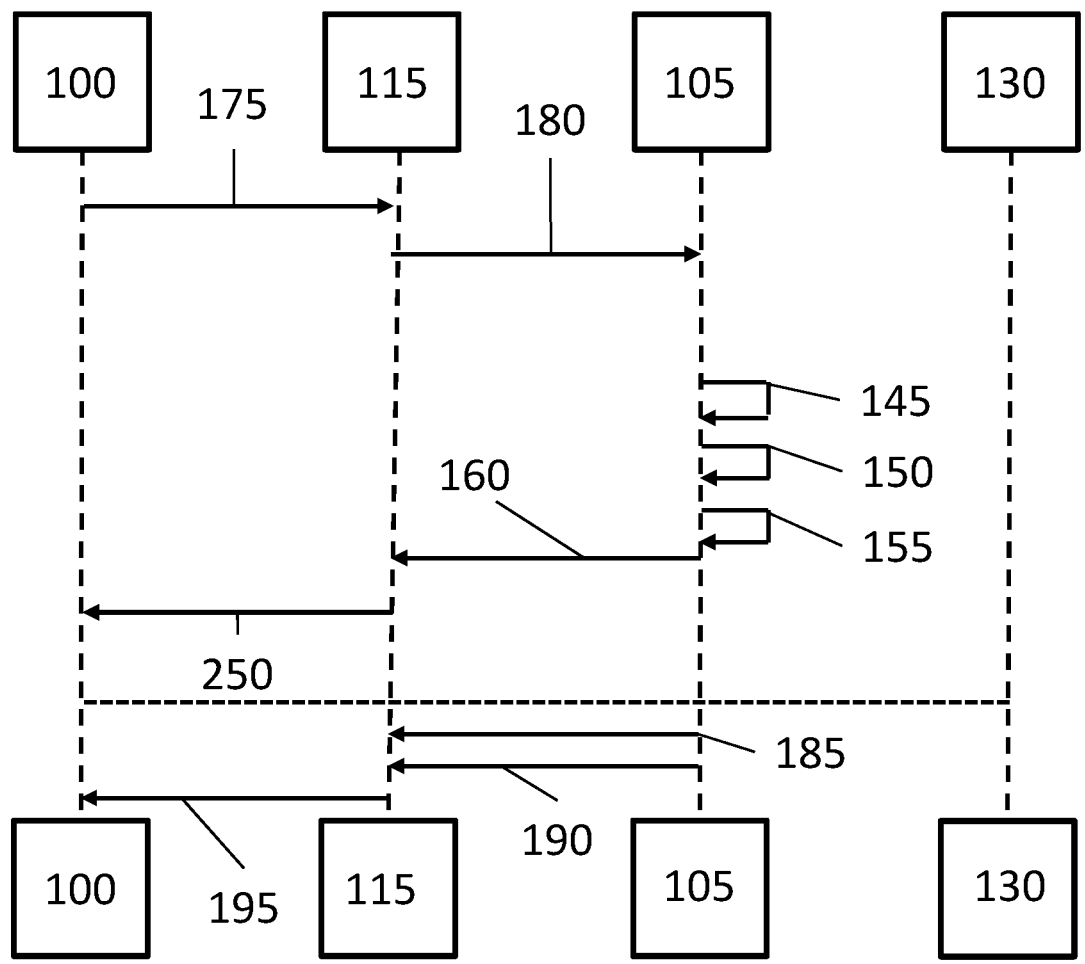
FIG. 2 is an operational flow schematic for additional retrieval of information in the database of FIG. 1, in accordance with one or more example embodiments.

In FIG. 2, an operational flow schematic for additional retrieval of information in the database of FIG. 1 in accordance with one or more example embodiments is shown. The components and processes indicated by specific reference characters of the compute system described above with respect to FIG. 1 are included in FIG. 2, but not discussed for brevity and clarity of the specific implementation.

After user 100 is finished reviewing the table provided in the initial page request 120, the user may submit a subsequent request 175 for additional information. The subsequent request 175 may be submitted through the CLI 115, which is then sent as a second request 180 to the database 105. In this implementation the database 105 had previously requested all tabular data be provided by publisher 130. As the database 105 already has access to all the requested data, the database 105 does not need to request 125 additional information from publisher 130. As such, database 105 fetches 145, prepares 150 and saves 155 the data in a table required to fulfil the second request 180.

After the table is saved 150, the database 105 sends 160 the table through the CLI 115 to be viewed by the user 100. At this point, the user 100 may receive 170 and view the second portion of the table.

As an example, user 100 may submit a page request 120 for 50 rows of data within a table. After the initial 50 rows are sent 170 and reviewed, user 100 may request the next portion of data, and the database 105 may send 160 the user 100 the next 50 rows of the table. This process may continue in a loop until the user 100 determines that no additional information is required. The user may then either stop requesting new portions of the table or may tell the database 105 that the review is complete, and the database 105 may purge its memory or otherwise stop providing information to the user 100.

In other implementations, the process may continue as a loop until no additional information is available to be sent to user 100. At this time, database 105 may send 185 the last pages along with an end of paging notification 190 to the CLI 115. The CLI 115 may then send an end notification 195 to the user 100. At this point, no additional data will be sent to user 100 based on the initial page request 120.

Because the sub-set of data that is transferred between the database 105 and the user 100 is smaller, system resources required may be decreased, thereby increasing the operability and efficiency of the compute system. Additionally, by decreasing the amount of processing by the database 105, response times to multiple users 100 may be increased and database 105 downtime may be decreased.

Figure 3:
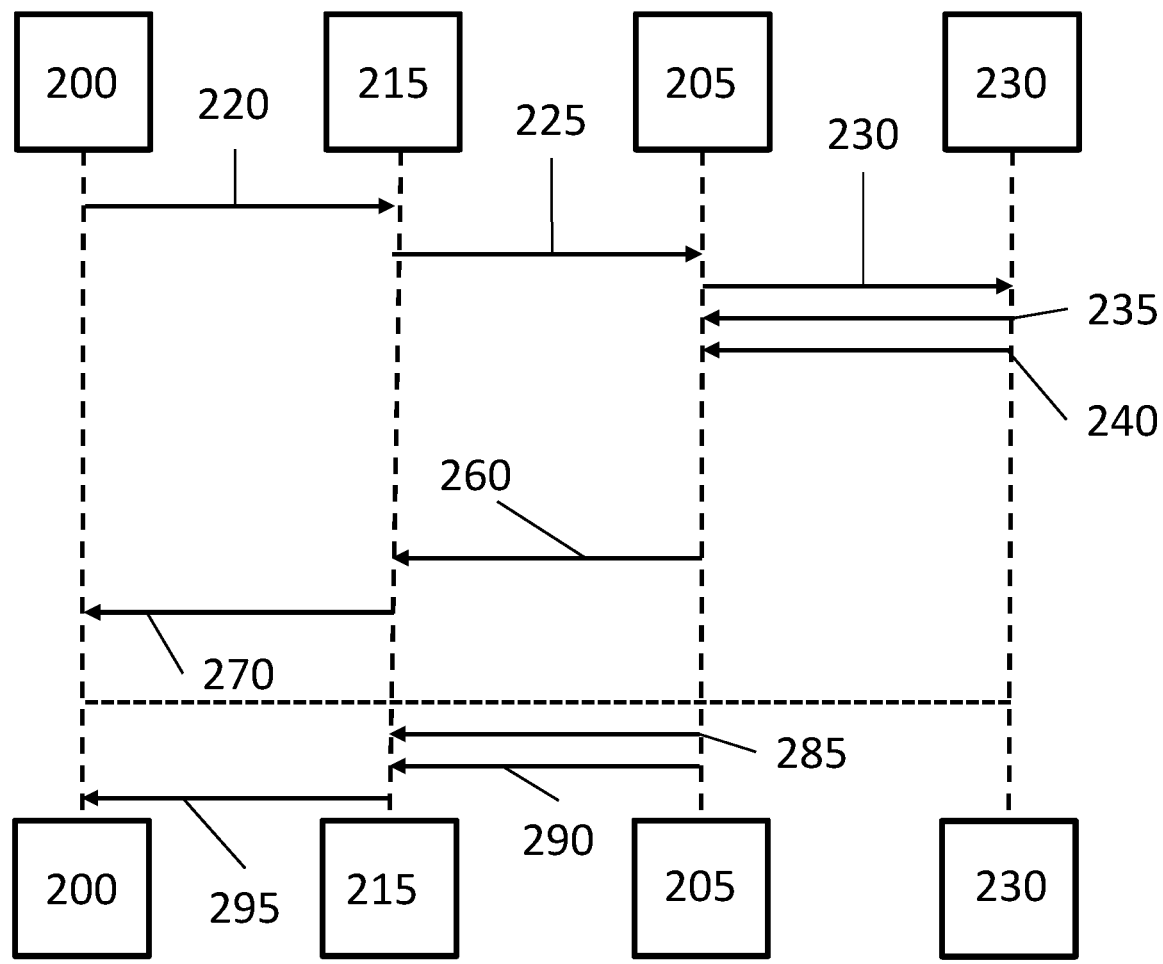
FIG. 3 is an operational flow schematic for the retrieval of information in databases in accordance with one or more example embodiments.

Turning to FIG. 3, an operational flow schematic for the retrieval of information in databases in accordance with one or more example embodiments is shown. Similar to above, a user 200 may access a computing system (not independently shown) including a database 205 through a CLI 215. The user 200 may send a command 220 through CLI 215 that is processed and sent from CLI 215 to database 205 as a page request 220. As explained above, page request 220 may include a request for various data from one or more network devices. The page request 220 may further include one or more table parameters, as defined above with respect to FIG. 1.

Upon receipt of page request 220, database 205 may send a publisher request to publisher 230. The publisher 230 may then publish 235 the requested information and send a completion message 240, indicating that all requested information has been provided to the database. In this implementation, rather than publish 235 all information contained in a table, the publisher 230 may only publish 235 a sub-set of the data.

For example, the page request 220 may have been for the first 50 rows of a table. Rather than publish 235 the entire table to database 205, publisher 230 may provide only the information requested in the page request 220. The database 205 then sends 260 the table through the CLI 215 to be viewed by the user 200. At this point, the user 200 may receive 270 and view the requested table.

Because no additional information is available at the database 205, the database may send 285 the last pages along with an end of paging notification 290 to the CLI 215. The CLI 215 may then send an end notification 295 to the user 200.

In such an implementation, the user 200 may submit subsequent page requests 220, thereby allowing the database 205 and publisher 230 to handle smaller amounts of information. Because the size of the data requested may be smaller, the time and system resources required to process the requests is decreased, thereby increasing the operability and efficiency of the compute system.

Figure 4:
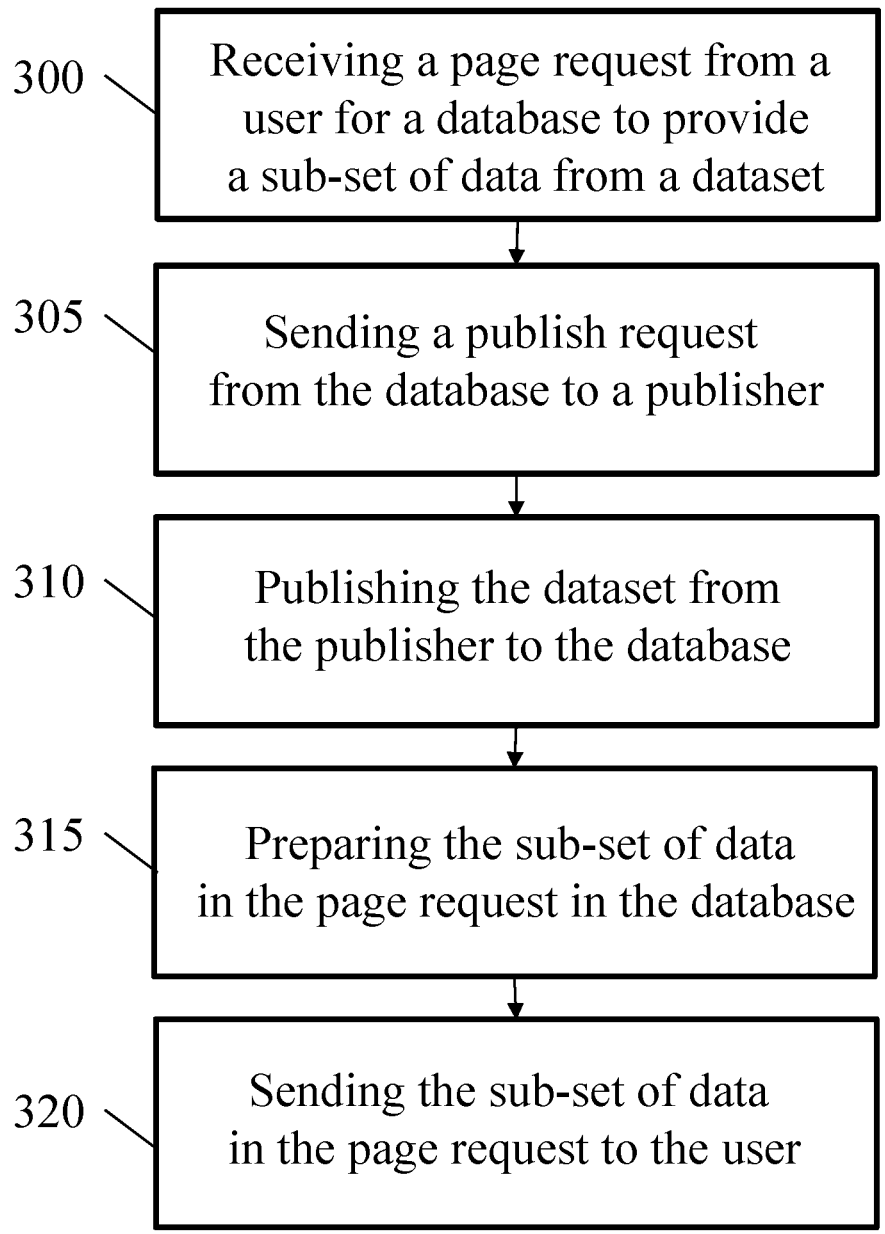
FIG. 4 is a flowchart of a method for providing data to users in accordance with one or more example embodiments.

Turning to FIG. 4, a flowchart of a method for providing data to a user in accordance with one or more example embodiments is shown. In this implementation, a page request is received (300) from a user for a database to provide a sub-set of data from a dataset. As explained in detail above, the page request may contain various table parameters, which may restrict the types of data or the sub-set of data, which is requested. In certain implementations the sub-set of data may include all data for a network device or combination of network devices within a compute system.

The method further includes sending (305) a publish request from the database to a publisher. The publisher may then access various processes on network devices and compile the information as data in tabular form, thereby forming a complete dataset. Those of skill in the art having the benefit of the present disclosure will appreciate that the definition of a complete dataset may vary according to the requirements of the operation. For example, a complete dataset may include all data received by the publisher. In other implementation, a complete dataset may refer to all data requested by the publisher based on, for example, the page request. Depending on the page request, the specific devices, etc., the tables may include hundreds of thousands or even millions of rows and/or columns.

The publisher may then publish (310) the dataset to the database. The information that is published may also depend on the requirements of the operation. As above, the dataset may be a complete dataset or otherwise include a partial dataset based on, for example, the requirements of the page request.

The database may then prepare (315) the sub-set of data from the page request. Preparing the sub-set may include various additional steps, including, for example, fetching requested rows from a table and saving the requested rows.

The sub-set of data requested in the page request may then be sent (320) to the user for review. As previously explained, this process may be looped, thereby providing a user multiple sub-sets of data in incremental batch form. Accordingly, on-demand provisioning of data from a dataset supplied by a publisher for a specific compute system device or devices may be established.

In certain implementations, a second page request may be received from a user, requesting the database provide a second sub-set of data from the dataset. In such a situation, the second sub-set of data in the second page request may be prepared by the database from the previously published database. In this implementation, subsequent requests to the publisher are not required because the publisher previously published a complete dataset. After preparing the second sub-set of data, the second sub-set of data may be sent to the user for review.

Methods may also include receiving a second page request from a second user to provide a second sub-set of data from the dataset. The database may then prepare the second sub-set of data in the second page request from the published dataset. In this implementation, the dataset that was published to the database may be used to service the requests of multiple users. The users may request different sub-sets of data in their respective page requests, however, the published dataset saved in the database may be used to fulfill both requests. After the second sub-set of data is prepared, the data may be sent to the second user for review.

In another implementation, a second page request may be sent by the user for a second sub-set of data from the dataset. A second publish request may be sent from the database to the publisher and the publisher may collect the requested data from compute system devices. After publishing the requested data, the database may prepare a second sub-set of data and send the data to the user for review. In this situation, the first dataset was not a complete dataset, and as such, the user required a subsequent, page request to receive the required information. This process may be looped, thereby allowing the user to submit multiple page requests, thereby instructing the database and publisher to incrementally batch deliver the requested information.

Methods may further include sending a second page request from the user to provide a second sub-set of data from the dataset. In this implementation, the second page requests may include a different table parameter. For example, the initial page request may have requested a certain number of rows or columns, while the second page request changes the rows or columns. Because the page request may be adjusted on-the-fly, the data provided may be varied to meet user requirements. In certain situations, the database may send numerous sub-sets of data to the user based on the page requests.

In certain situations, the database may receive a stop command from the user. The stop command may instruct the database to stop sending the sub-sets of data, thereby ending the request for information.

Figure 5:
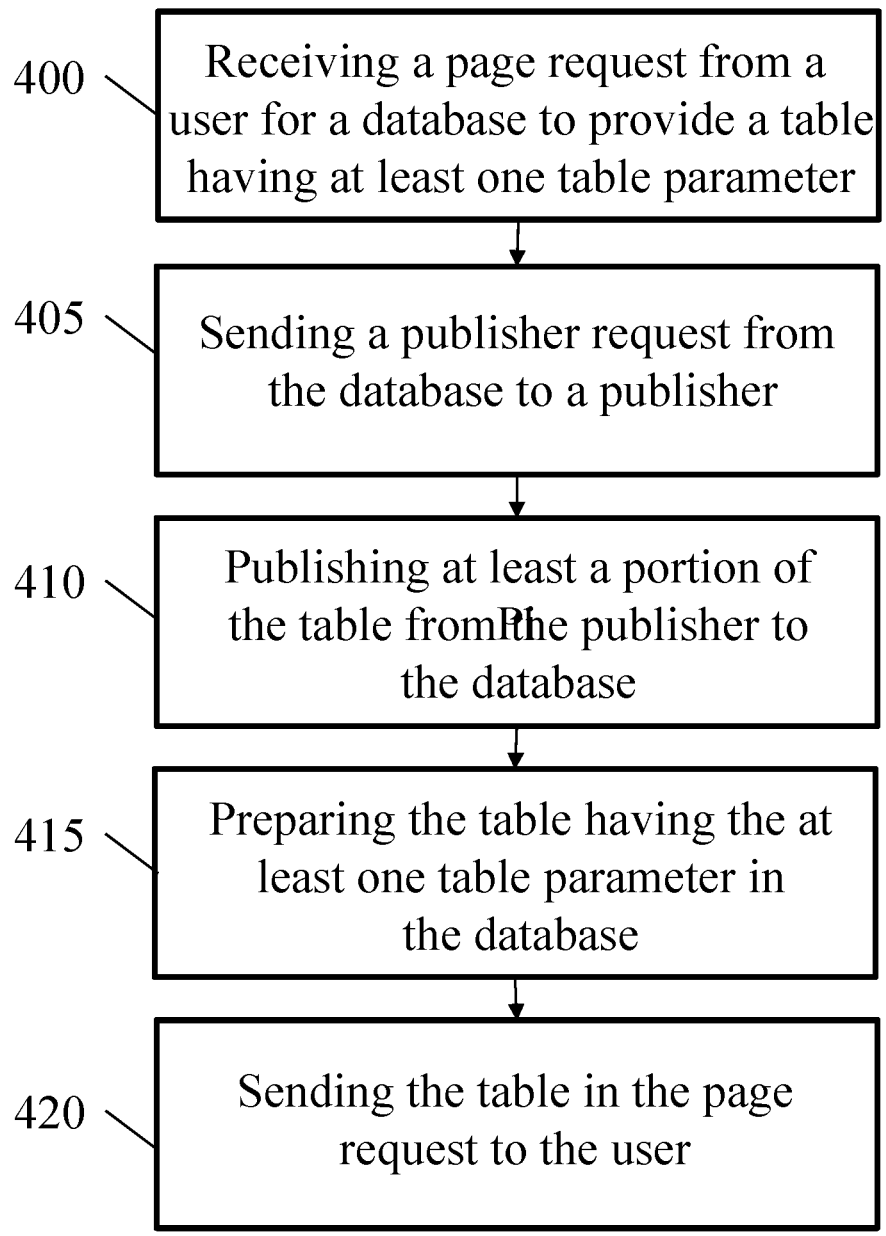
FIG. 5 is a flowchart of a method for providing data to users in accordance with one or more example embodiments.

Turning to FIG. 5, a flowchart of a method of providing data to a user in accordance with one or more example embodiments is shown. This method may include receiving (400) a page request from a user for a database to provide a table having at least one table parameter. The table parameter may include one or more of the table parameters previously identified.

The method further includes sending (405) a publish request from the database and publishing (410) at least a portion of the table from the publisher to the database. The portion of the table may refer to a complete portion from a compute system device, a partial table from one or more compute system devices, or other portions as defined in, the page request.

A table may then be prepared (415) in the database, the table having the at least one table parameter. After preparation (415) of the table, the table may be sent (420) to the user for review. This method may thereby allow a page request to include specific table parameters that are used by the database when creating the tables.

Figure 6:
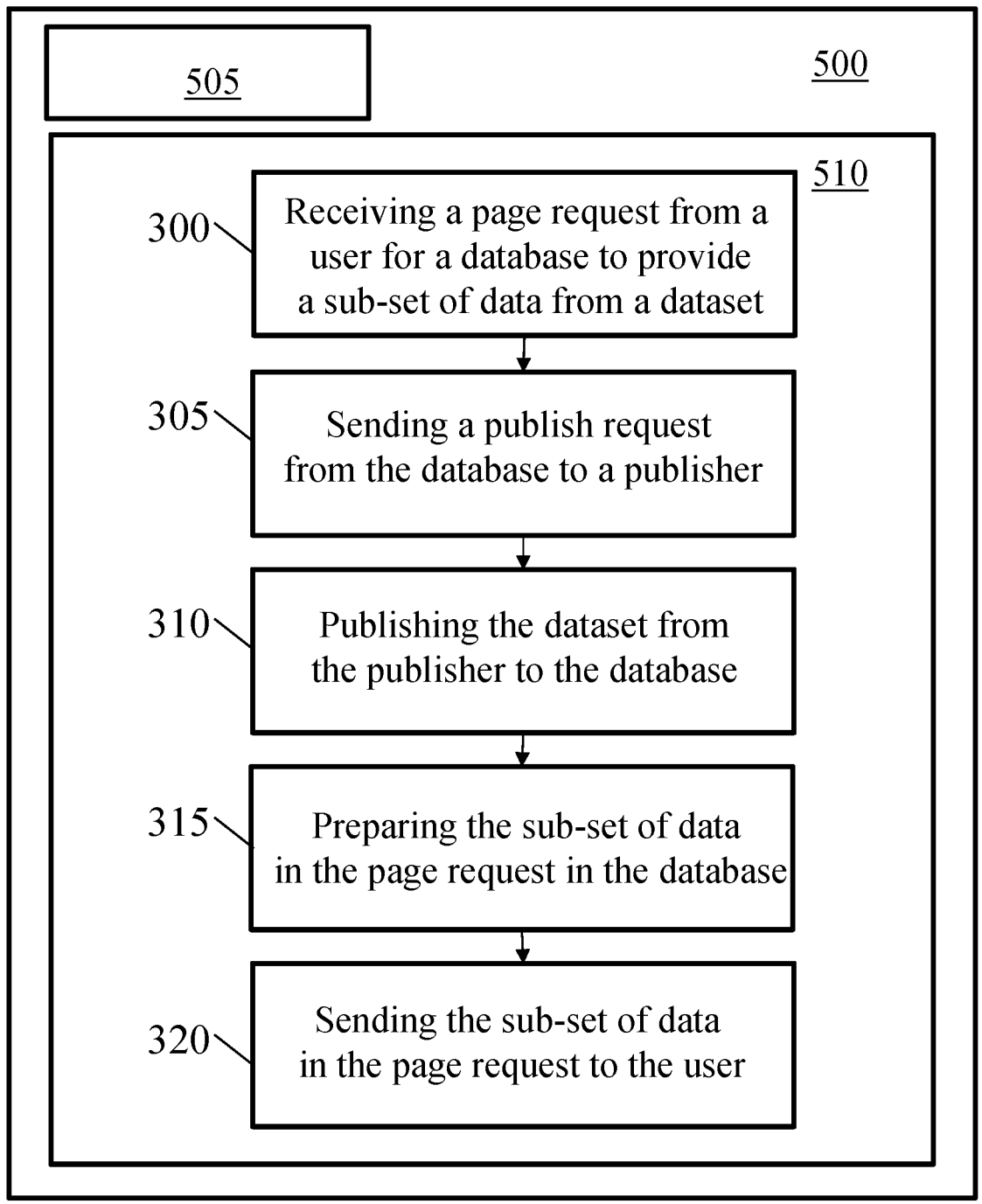
FIG. 6 is an example computing device with a hardware processor and accessible machine-readable instructions in accordance with one or more example embodiments.

Turning to FIG. 6, an example computing device with a hardware processor and accessible machine-readable instructions is shown in accordance with one or more, example embodiments. FIG. 6 provides is an example computing device 500, with a hardware processor 505 for performing the retrieval of information from network devices discussed above with respect to one or more disclosed example implementations. FIG. 6 illustrates computing device 500 configured to perform the flow described in blocks 300, 305, 310, 315, and 320, discussed in detail with respect to FIG. 4. However, computing device 500 may also be configured to perform the flow of other methods, techniques, functions, or processes described in this disclosure.

A machine-readable storage medium, such as 510 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 7:
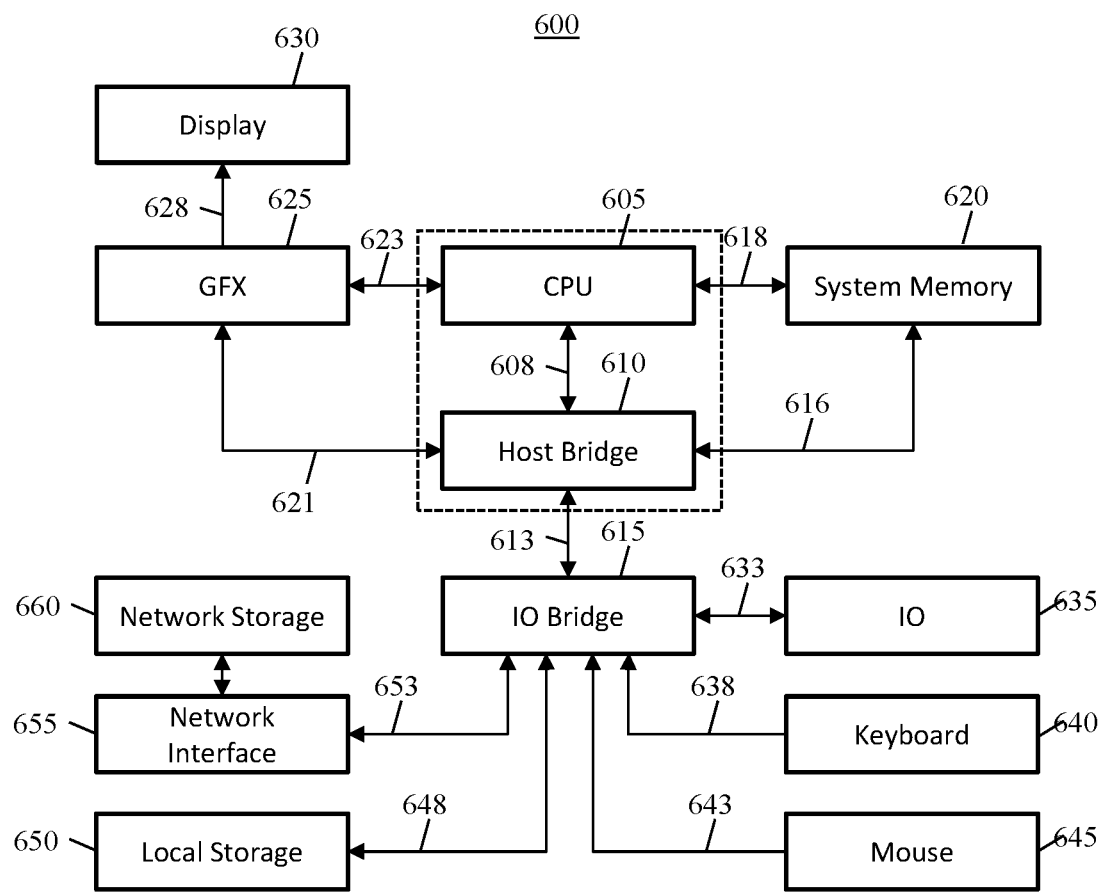
FIG. 7 is a schematic representation of a computer processing device that may be used to implement functions and processes in accordance with one or more example embodiments.

FIG. 7 shows a computing system 600 in accordance with one or more example embodiments. Computing system 600 may include one or more central processing units (singular "CPU" or plural "CPUs") 605 disposed on one or more printed circuit boards (not otherwise shown). Each of the one or more CPUs 605 may be a single core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computing system 600 may include one or more core logic devices such as, for example, host bridge 610 and input/output ("IO") bridge 615.

CPU 605 may include an interface 608 to host bridge 610, an interface 618 to system memory 620, and an interface 623 to one or more IO devices, such as, for example, graphics processing unit ("GFX") 625. GFX 625 may include one or more graphics processor cores (not independently shown) and an interface 628 to display 630. In certain embodiments, CPU 605 may integrate the functionality of GFX 625 and interface directly (not shown) with display 630. Host bridge 610 may include an interface 608 to CPU 605, an interface 613 to IO bridge 615, for embodiments where CPU 605 does not, include interface 618 to system memory 620, an interface 616 to, system memory 620, and for embodiments where CPU 605 does not include integrated GFX 625 or interface 623 to GFX 625, an interface 621 to GFX 625. One of ordinary skill in the art will recognize that CPU 605 and host bridge 610 may be integrated, in whole or in part, to reduce chip count, motherboard footprint, thermal design power, and power consumption. IO bridge 615 may include an interface 613 to host bridge 610, one or more interfaces 633 to one or more IO expansion devices 635, an interface 638 to keyboard 640, an interface 643 to mouse 645, an interface 648 to one or more local storage devices 650, and an interface 653 to one or more network interface devices 655.

Each local storage device 650 may be a solid-state memory device, a solid-state memory device array, a hard disk drive, a hard disk drive array, or any other non-transitory computer readable medium. Each network interface device 655 may provide one or more network interfaces including, for example, Ethernet, Fibre Channel, WiMAX, Wi-Fi, Bluetooth, or any other network protocol suitable to facilitate networked communications. Computing system 600 may include one or more network-attached storage devices 660 in addition to, or instead of, one or more local storage devices 650. Network-attached storage device 660 may be a solid-state memory device, a solid-state memory device array, a hard disk drive, a hard disk drive array, or any other non-transitory computer readable medium. Network-attached storage device 660 may or may not be collocated with computing system 600 and may be accessible to computing system 600 via one or more network interfaces provided by one or more network interface devices 655.

One of ordinary skill in the art will recognize that computing system 600 may include one or more application specific integrated circuits ("ASICs") that, are configured to perform a certain function, such as, for example, hashing (not shown), in a more efficient manner. The one or more ASICs may interface directly with an interface of CPU 605, host bridge 260, or IO bridge 615. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 605, host bridge 610, IO bridge 615, or ASICs or various sub-sets, super-sets, or combinations of functions or features thereof, may be integrated, in whole or in part, or distributed among various devices in a way that may vary based on, an application, design, or form factor in accordance with one or more example embodiments. As such, the description of computing system 600 is merely exemplary and not intended to limit the type, kind, or configuration of components that constitute a computing system suitable for performing computing operations, including, but not limited to, hashing functions. Additionally, one of ordinary skill in the art will recognize that computing system 600, an application specific computing system (not shown), or combination thereof, may be disposed in a standalone, desktop, server, or rack mountable form factor.

One of ordinary skill in the art will recognize that computing system 600 may be a cloud-based server, a server, a workstation, a desktop, a laptop, a netbook, a tablet, a smartphone, a mobile device, and/or any other type of computing system in accordance with one or more example embodiments.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Advantages of one or more example embodiments may include one or more of the following:

In one or more examples, methods disclosed herein may be used to increase compute system efficiency and operability by decreasing demand on databases caused by users requesting large datasets.

In one or more examples, methods disclosed herein may also prevent multiple users from reading and writing to databases due to large user requests.

In one or more examples, methods disclosed herein may also provide sub-sets of data to users in batch tabular format.

Not all embodiments will necessarily manifest all these advantages. To the extent that various embodiments may manifest one or more of these advantages, not all of them will do so to the same degree.

While the claimed subject matter has been described with respect to the above-noted embodiments, those skilled in, the art, having the benefit of this disclosure, will recognize that other embodiments may be devised that are within the scope of claims below as illustrated by the example embodiments disclosed herein. Accordingly, the scope of the protection sought should be limited only by the appended claims.

What is claimed is:

1. A method of providing data in a computer network, the method comprising:

receiving, at a database located on a switch of the computer network, a request for configuration and status information associated with a network device, wherein the request comprises one or more table parameters, wherein at least one table parameter specifies a predetermined page size, and wherein the request specifies one or more types of configuration and status information comprising at least network-layer protocol information;

sending, from the database to a publisher, a publish request comprising specified types of configuration and status information and the received table parameters, thus causing the publisher to access processes corresponding to the specified types of configuration and status information on the network device to collect the requested configuration and status information and publish a table based on the collected configuration and status information and the received table parameters;

in response to receiving, by the database from the publisher, a completion message, obtaining at least a portion of the published table;

preparing, based on the obtained portion of the table, a table page having the predetermined page size;

sending the table page in response to the request;

receiving a second request for additional configuration and status information associated with the network device;

sending a second publish request from the database to the publisher;

receiving, by the database, a second portion of the table from the publisher;

preparing a second table page based on the second request and the second portion of the table; and sending the second table page in response to the second request.

2. The method of claim 1, wherein the request is received from a first user, and wherein the second request is received from a second user.

3. The method of claim 1, wherein the request includes a session identification.

4. The method of claim 1, wherein the table page comprises fifty rows.

5. The method of claim 1, wherein the second request includes a different table parameter.

6. The method of claim 1, further comprising:
sending a plurality of table pages from the database based on the request.

7. The method of claim 6, further comprising:
receiving a stop command; and
stopping the database from sending the plurality of table pages.

8. A non-transitory computer readable medium comprising computer executable instructions stored thereon that when executed by one or more processing units perform a method to provide data in a computer network, the method comprising:

receiving, at a database located on a switch of the computer network, a request for configuration and status information associated with a network device, wherein the request comprises one or more table parameters, wherein at least one table parameter specifies a predetermined page size, and wherein the request specifies one or more types of configuration and status information comprising at least network-layer protocol information;

sending, from the database to a publisher, a publish request comprising specified types of configuration and status information and the received table parameters, thus causing the plublisher to access processes corresponding to the specified types of configuration and status information on the network device to collect the requested configuration and status information and publish a table based on the collected configuration and status information and the received table parameters;

in response to receiving, by the database from the publisher, a completion message, obtaining at least a portion of the published table;

preparing, based on the obtained portion of the table, a table page having the predetermined page size;

sending the table page in response to the request;

receiving a second request for additional configuration and status information associated with the network device;

sending a second publish request from the database to the publisher;

receiving, by the database, a second portion of the table from the publisher;

preparing a second table page based on the second request and the second portion of the table; and sending the second table page in response to the second request.

9. The non-transitory computer readable medium of claim 8, wherein the request is received from a first user, and wherein the second request is received from a second user.

10. The non-transitory computer readable medium of claim 8, wherein the method further comprises:
sending a plurality of table pages from the database based on the request.

11. The non-transitory computer readable medium of claim 10, wherein the method further comprises:
receiving a stop command; and
stopping the database from sending the plurality of table pages.

12. The non-transitory computer readable medium of claim 8, wherein the request includes a session identification.

13. The non-transitory computer readable medium of claim 8, wherein the table page comprises fifty rows.

14. The non-transitory computer readable medium of claim 8, wherein the second request includes a different table parameter.

* * * * *